United States Patent
Baraff et al.

(10) Patent No.: US 8,054,313 B1
(45) Date of Patent: Nov. 8, 2011

(54) SIMULATION REPAIR

(75) Inventors: David Baraff, Oakland, CA (US); Christine Waggoner, Berkeley, CA (US)

(73) Assignee: Pixar, Redwood Shores, CA (US)

(*) Notice: Subject to any disclaimer, the term of this patent is extended or adjusted under 35 U.S.C. 154(b) by 912 days.

(21) Appl. No.: 12/045,208

(22) Filed: Mar. 10, 2008

Related U.S. Application Data

(60) Provisional application No. 60/894,187, filed on Mar. 9, 2007.

(51) Int. Cl.
*G06T 13/00* (2011.01)
(52) U.S. Cl. .................. 345/475; 345/473
(58) Field of Classification Search .............. 345/473
See application file for complete search history.

(56) References Cited

U.S. PATENT DOCUMENTS

2006/0125830 A1* 6/2006 Piponi ............... 345/473
* cited by examiner

*Primary Examiner* — Xiao Wu
*Assistant Examiner* — Scott E Sonners
(74) *Attorney, Agent, or Firm* — Kilpatrick Townsend & Stockton LLP

(57) ABSTRACT

In various embodiments, the motion of simulated or secondary objects, such as the motion of cloth, of computer imagery and computer generated animations may be viewed as a time-varying signal. Accordingly, simulation results can be "filtered" to repair, reduce, or eliminate "damage" to the motion signal of regions of the simulated object where "jumps," "wigglies," "sags," "blemishes," or high frequency perturbations may occur during simulation. Simulation repair may be performed using a coordinate frame from one or more regions of the simulated object or of another reference object whose motion is not "damaged" like the motion of the regions to be repaired. The coordinate frame can be non-linear, temporally varying, or the like, and can provide a suitable reference to repair simulation results in an efficient and time-optimized manner with quality results.

22 Claims, 7 Drawing Sheets

SIMULATION REPAIR

CROSS-REFERENCES TO RELATED APPLICATIONS

This application claims the benefit of U.S. Provisional Application No. 60/894,187, filed Mar. 9, 2007, which application is incorporated herein by reference for all purposes.

BACKGROUND OF THE INVENTION

The motions of secondary elements in computer graphics imagery, such as clothing or cloth, are often too complex for an animator to directly control. Instead of a human animator determining the motion of these secondary elements, some computer programs use physically-based numerical methods to simulate their motion over time. For clothing or cloth, this is sometimes accomplished by modeling the physical properties of the cloth (e.g., how the cloth bends due to forces or collisions with solid objects, how the cloth deforms or collides with itself, or the like), the external forces on the cloth (gravity, wind), the motions of kinematic elements (e.g., the characters or objects upon which the cloth rests) associated with the secondary elements, or the like.

In many cases, the animation of kinematic elements is specified and is independent of and/or unaffected by the motion of the dynamic or secondary elements (e.g., cloth). As a concrete example, consider an animation of a human character standing upright, wearing a jacket. The human character (e.g., the kinematic element) may be directly animated by a skilled human animator. However, the motion of the jacket (e.g., the dynamic or secondary element) in response to the human's animation may be simulated using physically-based numerical techniques.

If the physical properties and external forces acting on dynamic or secondary elements are accurately modeled, the resulting motion is often "plausible" and seemingly realistic to a viewer. In other words, it will appear to a viewer that the cloth hangs down and folds naturally, and that the cloth reacts naturally in response to a character's motions. Typically, the software and mathematics underlying physical simulations of this nature are highly complex.

It has been determined by the inventors, that for any number of reasons, a simulation system may produce output motion that is mostly but not typically fully correct. In other words, some small number of defects in the output motion are still observable. A particularly common defect in this adverse motion involves localized regions of the cloth undergoing high frequency perturbations or "fluttering," relative to the overall motion of the cloth, in localized time spans. Said differently, small sections of a simulated cloth may occasionally "jump" or "twitch" as though the motion were in reaction to an invisible object or force. These perturbations are typically visually unacceptable, and typically need to be eliminated.

Accordingly, what is desired are improved methods and apparatus for solving the problems discussed above. Additionally, what is desired are improved methods and apparatus for reducing some of the drawbacks discussed above.

BRIEF SUMMARY OF THE INVENTION

In various embodiments, the motion of simulated or secondary objects, such as the motion of cloth, of computer imagery and computer generated animations may be viewed as a time-varying signal. Accordingly, simulation results can be "filtered" to repair, reduce, or eliminate "damage" to the motion signal of regions of the simulated object where "jumps," "wigglies," "sags," "blemishes," or high frequency perturbations may occur during simulation. Simulation repair may be performed using a coordinate frame from one or more regions of the simulated object or of another reference object whose motion is not "damaged" like the motion of the regions to be repaired. The coordinate frame can be non-linear, temporally varying, or the like, and can provide a suitable reference to repair simulation results in an efficient and time-optimized manner with quality results.

In one embodiment, a "damaged" region of a simulated object to be repaired can be determined. The region may be determine by input from a user selecting a damaged location, for example, when the user notices undesirable motion in the simulation results. The region may also be determined automatically based on one or more algorithms that detect adverse motion, such as sags beyond a given threshold or limit, "flutters," or other high frequency movements in regions of the simulated object. The simulation results in the determined "damaged" region to be repaired can be altered or modified to reduce the damage or correct/eliminate the adverse motion using a temporally varying coordinate frame. In one embodiment, the simulation results can be time filtered in response to the temporally varying coordinate frame. In another embodiment, the simulation results can be modified by interpolating between temporally distinct shapes of the region of the simulated object to be repaired.

The temporally varying coordinate frame may be provided by a user selecting an undamaged region of the simulated object. In one embodiment, the user may select a region from another object different from the simulated object to act as a reference object. In some embodiments, the temporally varying coordinate frame can be determined algorithmically. For example, the coordinate frame may be determined automatically from the boundary of the region of the simulated object to be repaired. This coordinate frame-based approach can avoid modifying global rotational and translational motion of the affected region or area of the simulated object that would otherwise cause visual artifacts to appear in the simulation results simulation.

A further understanding of the nature and the advantages of the inventions disclosed herein may be realized by reference of the remaining portions of the specification and the attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

DETAILED DESCRIPTION OF THE INVENTION

In various embodiments, simulation results can be "filtered" to repair, reduce, or eliminate "damage" to the motion signal of regions of the simulated object where "jumps," "wigglies," "sags," "blemishes," or high frequency perturbations may occur during simulation. Simulation repair may be performed using a coordinate frame from one or more regions of the simulated object or of another reference object whose motion is not "damaged" like the motion of the regions to be repaired. The coordinate frame can be non-linear, temporally varying, or the like, and can provide a suitable reference to repair simulation results in an efficient and time-optimized manner with quality results.

Generally, modifications of the global rotational or translational motion of a region of a simulated object can almost always result in a visible artifact between the modified and unmodified sections or regions of the object. Therefore, in some embodiments, the motion signal associated with a simulated object can be separated into two components: a rigid body motion, which is not disturbed, and the remaining component, which may be termed the "shape component" of the object. In various embodiments, the shape component of the motion signal of a region of the simulated object to be repaired may be modified using a temporally varying coordinate frame, as described further below, to repair, reduce, or eliminate visual artifacts and other adverse or undesirable motions that may appear during simulation.

Figure 1:
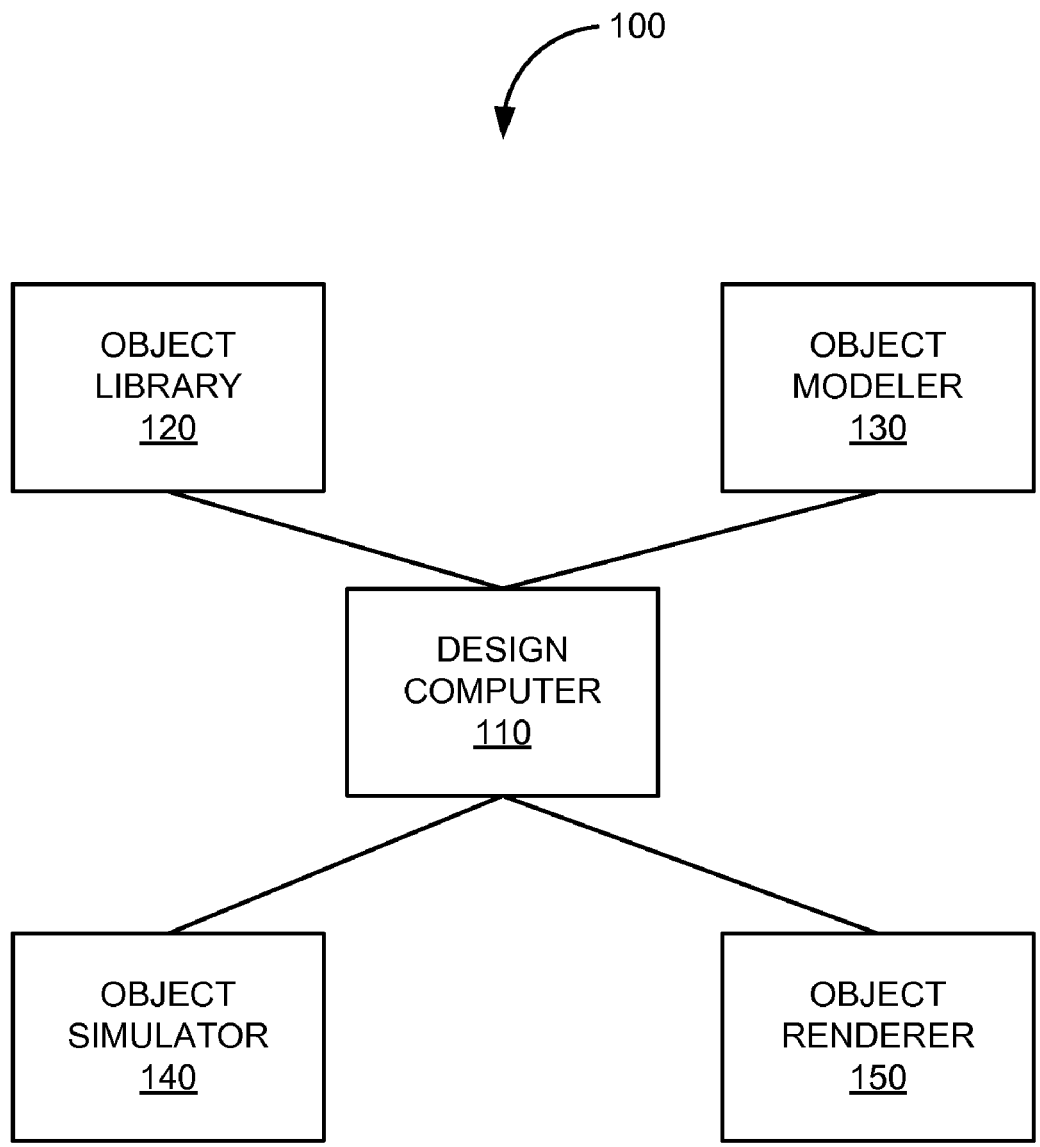
FIG. 1 is a simplified block diagram of a system for creating computer graphics imagery and animation that may incorporate embodiments of the present invention.

FIG. 1 is a simplified block diagram of system 100 for creating computer graphics imagery and animation that may incorporate embodiments of the present invention. In this example, system 100 includes design computer 110, object library 120, object modeler 130, object simulator 140, and object render 150.

Design computer 110 can be any PC, laptop, workstation, mainframe, cluster, or the like. Design computer 110 may include one or more general purpose central processing units (CPUs), one or more graphical processing units, memories (e.g., random access memory or read-only memory), storage devices, or other general purpose or specific purpose devices that assist in creating, modeling, simulating, or rendering computer imagery and/or animations.

Design computer 110 may include computer executable instructions which when executed by one or more processors or other microcontrollers become operational as operating systems, drivers and manager, applications, or the like.

Object library 120 can be any hardware and/or software elements configured to store information related to objects. Object library 120 may be a database or other storage mechanism from which a user may design, pose, animate, simulate, render, or the like, one or more objects for computer imagery and/or computer animation. Object library 120 may include information related to an object, such as object geometry, object topology, object attributes (e.g., how the object reacts to one or more physically-based simulation techniques), object rigging, information related to controls or animation variables (avars), paint data, shader data, or the like.

Object modeler 130 can be any hardware and/or software configured to model an object. Object modeler 130 may provide one or more interfaces that allow a user to create 2-dimentional, 3-dimentional, or n-dimensional models of an object. Object modeler 130 may provide various functionalities to create skeletons, rigs, skinning, or the like of an object, and associated one or more controls or animation variables (e.g., forward kinematics or inverse kinematics) for animating the model of the object. Information related to the model of an object may be stored in object library 120.

Object simulator 140 can be any hardware and/or software configured to simulate an object. Object simulator 140 may include one or more interfaces that allow a user to specify one or more simulation techniques for simulating an object. In one embodiment, object simulator 140 can generate simulation results using physically-based numerical techniques. The simulation results may include the motions and positions of a simulated object with respect to an animation cue.

The process of determining the motion of objects (e.g., cloth garments or the like) over time in reaction to an object's movement (e.g., a character's movements) that may be performed by object simulator 140 is called herein a "simulation process."

Object renderer 150 can be any hardware and/or software configured to render an object. Object renderer 150 may include one or more interfaces that allow a user to specify lighting, cameras, points-of-view, or the like for rendering an object as a computer image or as a sequence of images to generate a computer animation. Object renderer 150 may provide one or more mechanisms (e.g., ray tracing or rasterization) for determining pixel data associated with a rendered object. In some embodiments, object renderer 150 may include a cluster or grid of computers that can generate still images, animations, motion picture sequences, or the like of objects in sequence or in parallel. Object renderer 150 may output computer images in one or more formats, such as the Joint Photographic Experts Group format (JPEG), the tagged image file format (TIF), or the portable network graphics format (PNG). Object renderer 150 may output sequences of images or video frames in one or more formats, such as the Moving Picture Experts Group format (MPEG-1, MPEG-2, MPEG-4, H.264), the digital video format (DV), Realvideo, Theora, or the like.

As discussed previously, output motion of a simulated object using one or more simulation or physically-based numerical techniques can be mostly, but not fully correct. Therefore, some small number of defects in the output motion can often be still observable. One example of this undesirable or adverse motion can involve localized regions of simulated objects, such as cloth, that undergo high frequency perturbations in localized time spans relative to the overall motion of the object. These small sections of a simulated object may occasionally "jump" or "twitch" as though the motion were in reaction to an invisible object or force. Therefore, the perturbations can be visually unacceptable, and may need to be repaired, corrected, or eliminated.

Figure 2B:
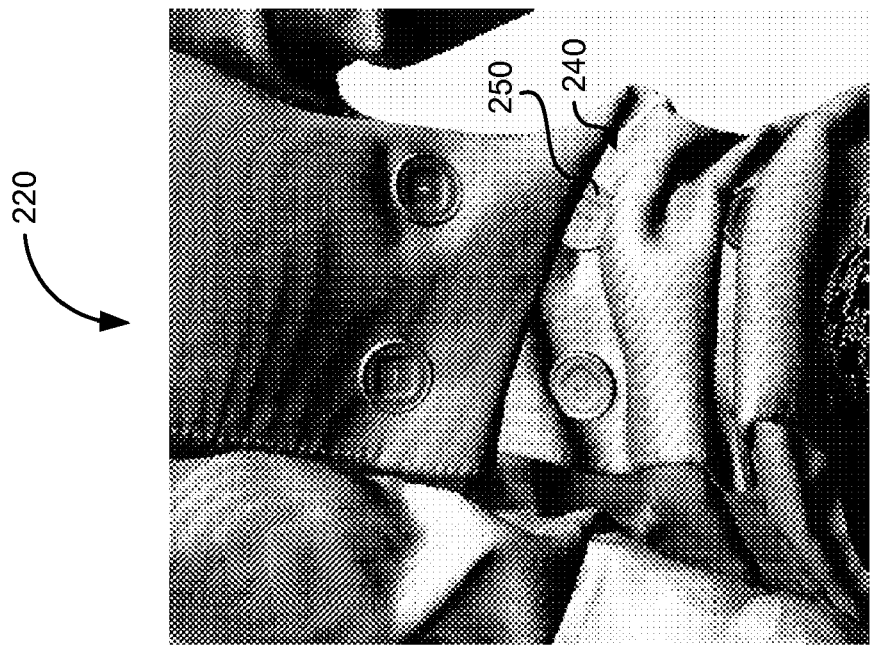
FIGS. 2A and 2B illustrate an example of a localized region defect and correction in one embodiment according to the present invention.
Figure 2A:
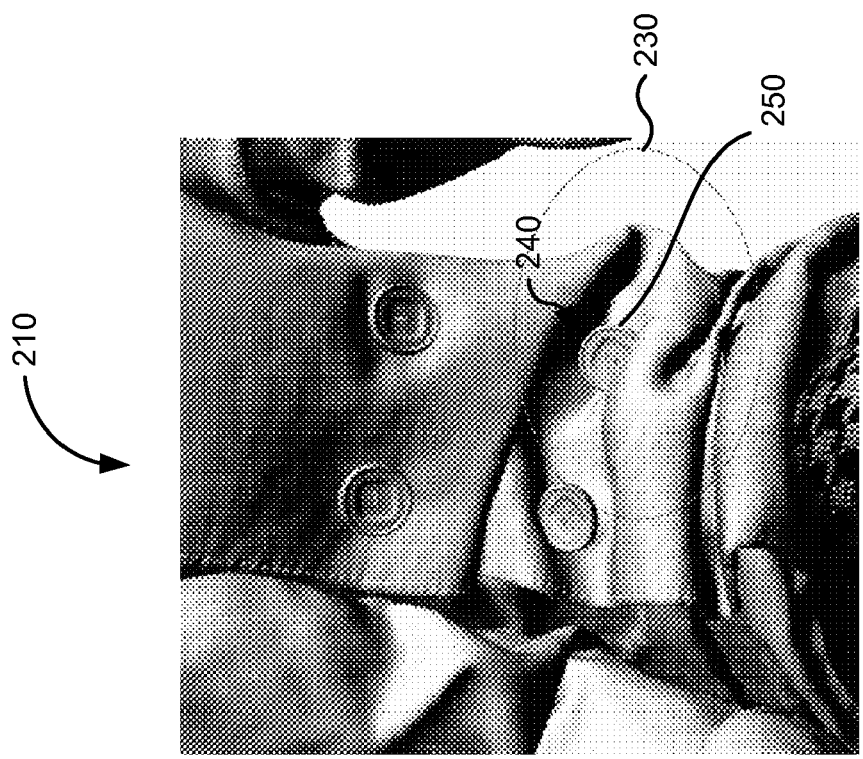

FIGS. 2A and 2B illustrate an example of a localized region defect and correction in one embodiment according to the present invention. More specifically, FIGS. 2A and 2B illustrate two frames (e.g., frames 210 and 220) in the simulation results of a simulation process showing one or more defects in the motion of a region of a simulated object. Referring to FIG. 2A, circled portion 230 of the cloth (i.e., the simulated object) of a jacket includes a cloth section 240 and a button 250. In this example, cloth section 240 and button 250 appear to have shifted or sagged downward and undergone a small but visually significant change in shape (e.g., sagging relative to the position of cloth section 250 and button 250 in FIG. 2B). This shifting often happens over a very short frame interval, and for no apparent reason (i.e., none of the other cloth shifts, and/or there is no other movement of the jacket or character associated with the jacket that would likely account for the motion).

Later in the animation, as illustrated in FIG. 2B, the same cloth section 240 of the cloth "jumps up." In this example, cloth section 240 of the cloth of the jacket moves slightly back upward from the earlier position of cloth section 240 seen in FIG. 2A. Often, the final position of cloth section 240, such as shown in FIG. 2B, may not be the position or shape of cloth section 240 as found prior to FIG. 2A. These types of jumps and sags as illustrated by the combination of FIGS. 2A and 2B may continue over a series of frames, altering between sagging and jumping, thus causing undesirable fairly high frequency motion or "flutters" in the cloth of the jacket.

Possible solutions to fix the high frequency defects in simulation results of the simulation include modifying one or more parameters input into the simulation, and/or changing the simulation program itself, or the like, and then rerunning the simulation process. Such solutions can be very expensive, however, because often the simulation processes take quite some time to run. Additionally, it can be highly uncertain whether a change to the program (e.g., a bug fix) or a change in the input parameters may actually fix the problem. Moreover, even formulating such a change to the simulation program or the input parameters can be time-consuming, impractical, or both.

According to various embodiments, the output or simulations results of a simulation of a simulated object can be directly altered, updated, or modified to repair defects in one or more specific regions determined to be damaged without rerunning the entire simulation. This is especially beneficially when the modification process takes merely a small amount of time, and the success (or failure) of the modification can be immediately seen. As a very rough analogy, consider a photograph with a small cosmetic blemish. If it is impractical to reshoot the image for some reason, being able to quickly "airbrush" the blemish out to repair the photograph becomes invaluable by saving both time and cost.

Figure 3:
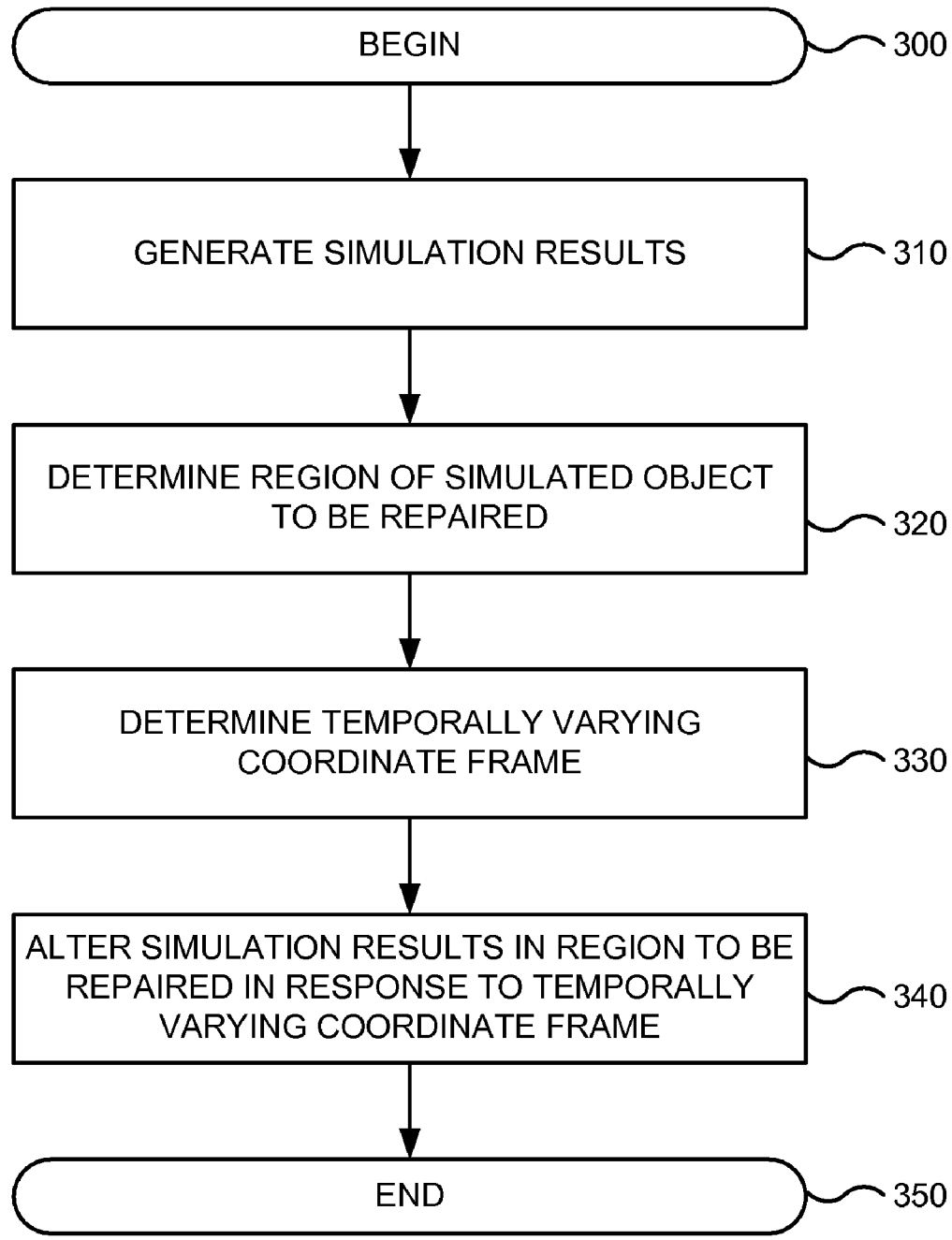
FIG. 3 is a flowchart of a method for repairing object simulation in embodiment according to the present invention.

FIG. 3 is a flowchart of a method for repairing object simulation in embodiment according to the present invention. The processing depicted in FIG. 3 may be performed by software modules (e.g., instructions or code) executed by a processor of a computer system, by hardware modules of the computer system, or combinations thereof. FIG. 3 begins in step 300.

In step 310, simulation results are generate using one or more simulation processes. For example, motions and positions of a simulated object may be determined by object simulator 140 in response to a kinematic object a computer animation scene. The kinematic object may influence the motion and position of the simulated object, in conjunction with other simulated forces, such as gravity, friction, and other forces internal to the simulated object.

In step 320, a region of a simulated object to be repaired is determined. The region to be repaired can be a point, a set of points, a line, a curve, a surface region, a volume, or the like. The region can include all of the simulated object or simply a portion of the simulated object. In some embodiments, the region can be determined based on input from a user selecting a damaged portion, area, or surface of the simulated object. The region may also be determined algorithmically. For example, a detection algorithm may automatically determine portions or areas of the simulated object that include or exhibit high frequency defects or perturbations in their motion, such as those motions that exceed a predetermined threshold or limit or otherwise satisfy motion detection criteria.

In step 330, a temporally varying coordinate frame is determined. The coordinate frame is determined by reference to a reference object. The reference object may be the same as the simulated object or the reference object may be another object different from the simulated object. The coordinate frame may be determined from the reference object based on input from the user selecting a portion, area, or surface, of the simulated object that does not need to be repaired. For example, the user may select a region of the simulated object that is not damaged or otherwise affected by the adverse motion of the region to be repaired. In some embodiments, the coordinate frame is determined from the reference object algorithmically. For example, one or more algorithms can detect high frequency perturbations in the motion of a region of the simulated object, and automatically select a boundary of the region to be repaired from which to determine the temporally varying coordinate frame.

The temporally varying coordinate frame can be used as a reference to repair the simulation results of the simulated object. As discussed above, modification of the global rotational or translational motion of a region of an object can almost always result in a visible artifact between the modified and unmodified sections of the object. In some embodiments, the motion signal in the simulation results of the simulated object may be separated into two components: a rigid body motion, which is not disturbed, and the remaining component, which may be termed the "shape component" of the object. This shape component can be the component can be altered or modified using the temporally varying coordinate frame, as described below, to repair the simulation.

Consider again the example of the cloth of the jacket shown in FIGS. 2A and 2B. Mathematically, let $p_i(t)$ be the world-space position of the ith cloth-mesh point whose motion is to be modified. At time t, a rigid coordinate transformation is defined by a translation vector c(t) in space, and a 3×3 rotation matrix R(t). Accordingly, the local coordinates of the ith cloth point are $b_i(t)$ which can be defined by equation (1):

$$b_i(t)=R^{-1}(p_i(t)-c(t)) \qquad (1)$$

In various embodiments, R(t) and c(t) may be the same for all points $p_i(t)$. Within this localized frame (i.e., the temporally varying coordinate frame), any number of filtering (or interpolation) techniques can be used to transform the blemished signal $b_i(t)$ to a modified signal $b'_i(t)$ in the simulation results. For example, to modify some region of the cloth of the jacket shown in FIGS. 2A and 2B over the time-interval $t_0$ to $t_1$, $b'_i(t)$ could be defined by equation (2):

$$b'_i(t)=(1-a)b_i(t_0)+ab_i(t_1) \text{ where } a=(t-t_0)/(t_1-t_0) \qquad (2)$$

In various embodiments, this relationship applies for $t_0<t<t_1$; outside this range, $b'_i(t)=b_i(t)$. The interpolation illustrated above is only one example of any number of possible filtering functions that can be performed, in other examples, low-pass filtering or other techniques may also be used. In various embodiments, an interpolation relationship can be employed as an extremely powerful technique, when processed in the correct coordinate system.

In various embodiments, regardless of which filter is chosen to determine $b_i(t)$ to $b'_i(t)$, the process can include transforming $b'_i(t)$ within the modified local coordinates space back to $p'_i(t)$ within world-space. In various embodiments, the final modified, world-space position $p'_i(t)$ could be obtained by equation (3):

$$p'_i(t)=R(t)b'_i(t)+c(t) \qquad (3)$$

In various embodiments, choosing of a suitable time-varying or temporally varying coordinate frame or system (i.e., defining R(t) and c(t) as time-varying functions) can be done in a number of ways. One possibility is to attempt to extract rigid coordinate frames from the underlying animated body itself (i.e., the animated skin the simulated cloth sits atop). However, such an approach fails in cases when the cloth undergoes a significant amount of sliding with respect to the skin surface.

As discussed above, another approach to determine a temporally or time-varying coordinate system is to determine a coordinate frame using motion for a set of simulated cloth points $r_i(t)$ that are "near enough" to the damaged cloth region that is to be repaired. It is expected that the motion for the set of simulated cloth points $r_i(t)$ shares the same overall motion as the cloth points requiring repair.

Figure 4A:
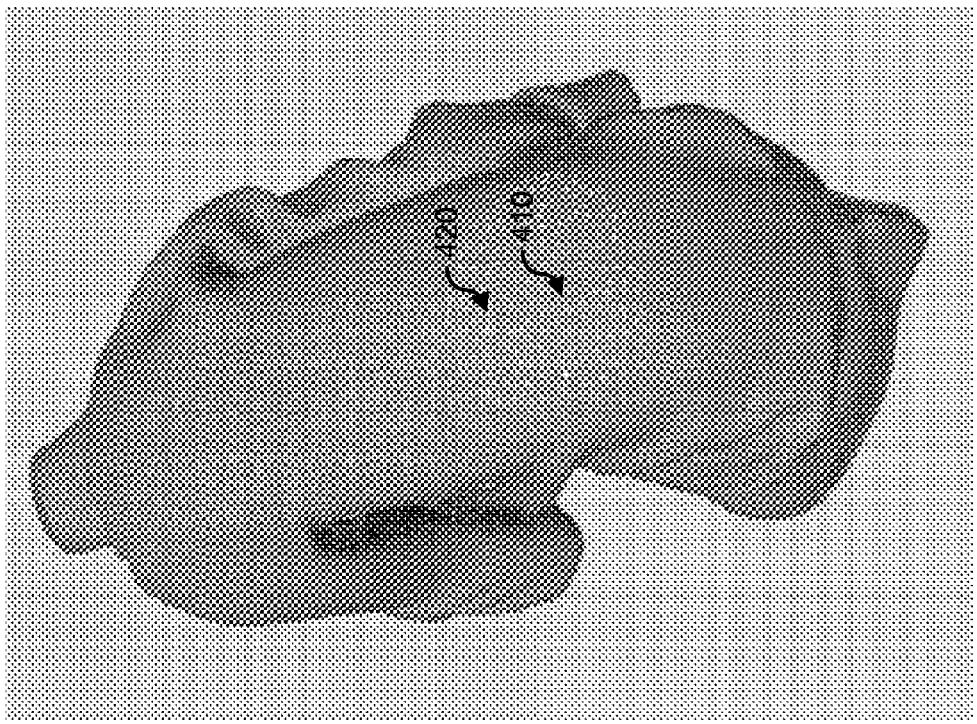
FIGS. 4A and 4B illustrate examples of damaged points and reference points in one embodiment according to the present invention.
Figure 4B:
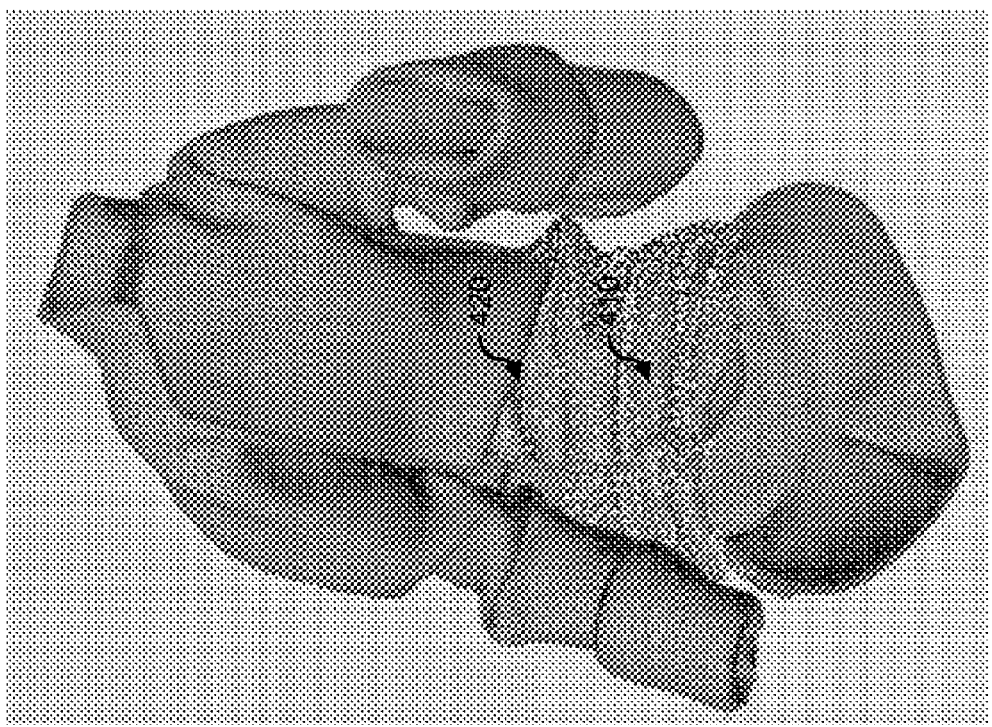

In various embodiments, this boundary or set of points are termed a "reference set." Examples of "damaged points" include points highlighted in areas 410 on the stomach and lower back regions of the cloth in FIGS. 4A and B. Examples of "reference points" include points around the stomach and lower back regions in areas 420 of the cloth in FIGS. 4A and 4B.

Referring again to FIG. 3, in step 340, the simulation results are altered in the region of the simulated object to be repaired in response to the temporally varying coordinate frame. For example, the temporally varying coordinate frame can be used as a local coordinate frame for the damaged region of the simulated object. Continuing the previous example, mathematically, given the positions $r_i(t)$ and a time interval $t_0$ to $t_1$, computing R(t) and c(t) for $t_0 < t < t_1$ can be performed. In various embodiments, c(t) is defined to be reference set's centroid by equation (4):

$$c(t) = \frac{1}{n}\sum_{i=1}^{n} r_i(t) \quad (4)$$

Accordingly, in various embodiments, the rotation matrix R(t) is defined by $R(t)=VU^T$ where, in equation (5):

$$UWV = C = \sum_{i=1}^{n} (r_i(t_0) - c(t_0))(r_i(t) - c(t))^T \quad (5)$$

is the singular value decomposition of the covariance matrix C. In various embodiments, the definition of the singular value decomposition requires that W be a diagonal matrix and that U and V be orthogonal; as a result, $R(t)=VU^T$ is itself orthogonal.

Given R(t) and c(t), the sequence of operations described by the above can be run at each successive time-frame of the animation over the region of frames where repair is necessary. Individual point sets $p_i$ and $r_i$ and frame ranges can be chosen by a user for each simulation "blemish" that requires processing.

In practice, the repair process described above requires orders of magnitude less processing than the original simulation itself, for any typical filtering operation (low-pass filtering, interpolation, etc.). Further, the results of such operations can be visualized demonstrated essentially instantly using modern computing equipment. FIG. 3 ends in step 350.

Figure 5:
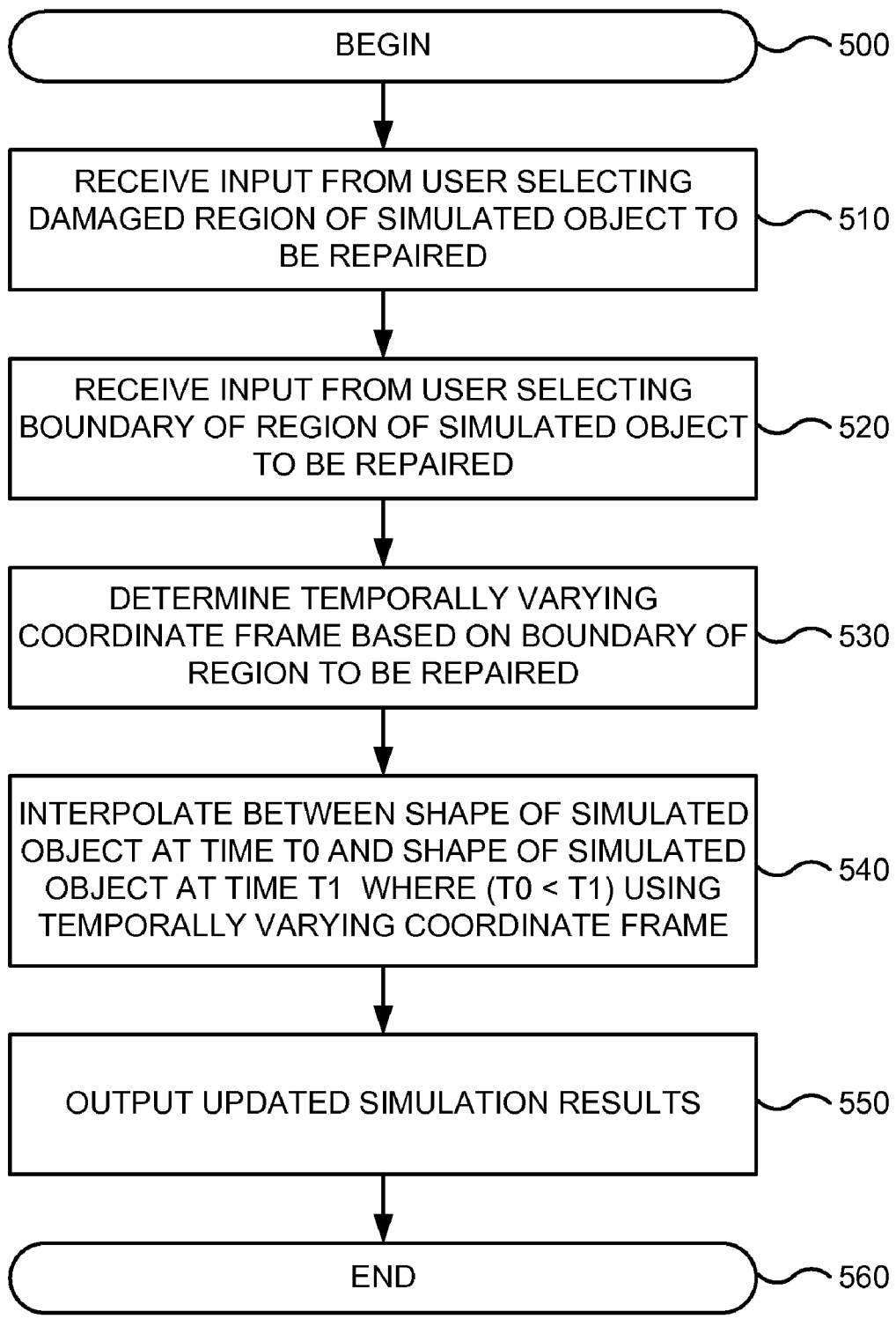
FIG. 5 is a flowchart of a method for updating simulation results by interpolating between temporally distinct shapes of a simulated object using a temporally varying coordinate frame in one embodiment according to the present invention.

FIG. 5 is a flowchart of a method for updating simulation results by interpolating between temporally distinct shapes of a simulated object using a temporally varying coordinate frame in one embodiment according to the present invention. FIG. 5 begins in step 500.

In step 510, input is received from a user selecting a damaged region of a simulated object to be repaired. For example, the user may identify and select one or more points, curves, surface region, or the like, of the simulated object that the user wished to repair. In step 520, input is received from the user selecting a boundary of the region of the simulated object to be repaired. For example, the user may identify one or more points, curves, surface regions, or the like, that surround the region to be repaired of the simulated object.

In step 530, a temporally varying coordinate frame is determined based on the boundary of the region to be repaired. In step 540, an interpolation is performed between a shape of the simulated object at time $t_0$ and a shape of the simulated object at time $t_1$ where ($t_0 < t_1$) using the temporally varying coordinate frame. In one example, a first shape of the simulated object may be identified at $t_0$ of the simulation and a second share of the simulated object may be identified at $t_1$.

The simulation results may be repaired or filtered by interpolating between the two temporally distinct shapes of the simulated object using the temporally varying coordinate frame. In step 550, the updated simulation results are outputted (e.g., the updated simulation is displayed). FIG. 5 ends in step 560.

Figure 6:
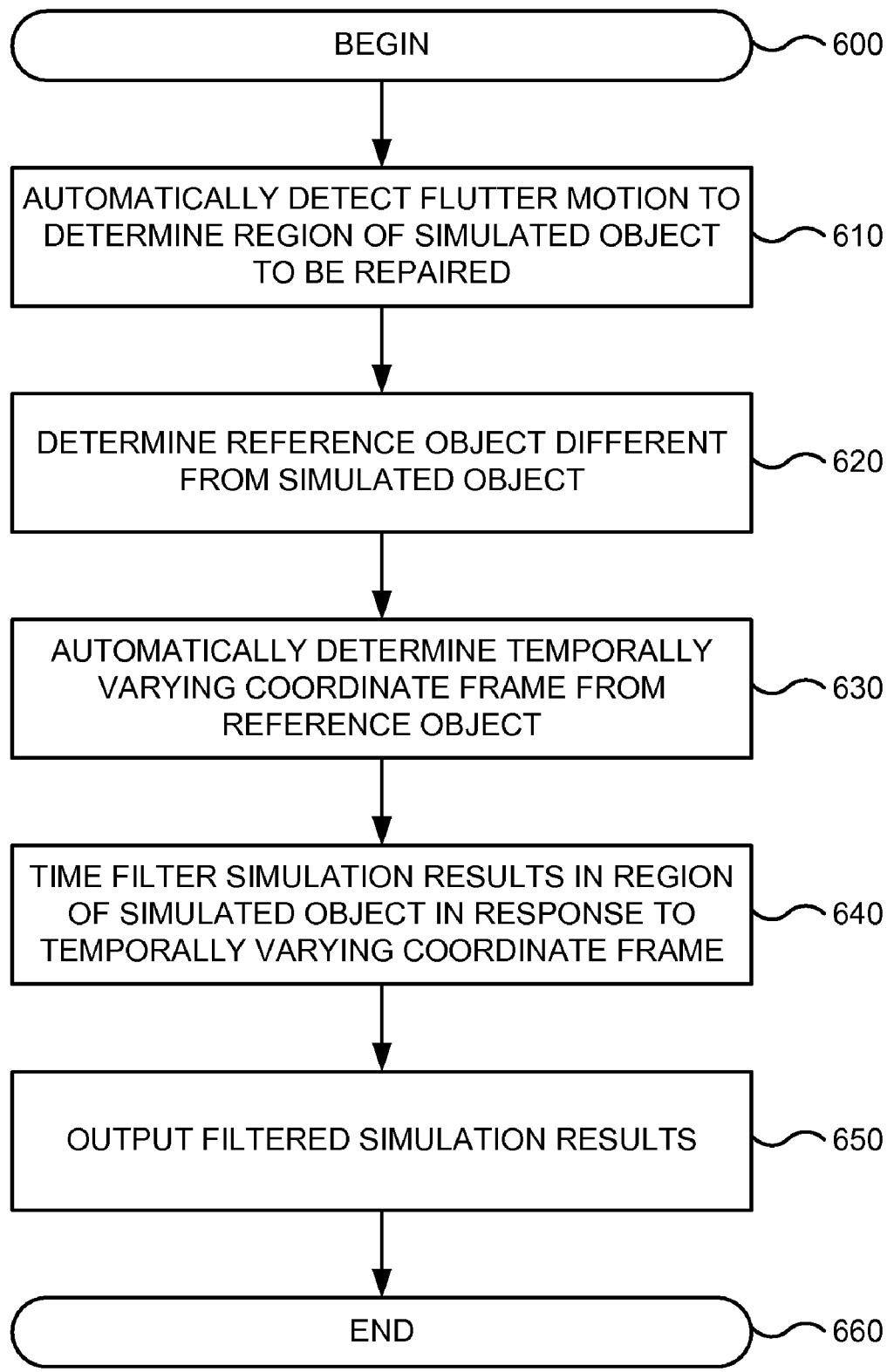
FIG. 6 is a flowchart of a method for time filtering simulation results in response to a temporally varying coordinate frame in one embodiment according to the present invention.

FIG. 6 is a flowchart of a method for time filtering simulation results in response to a temporally varying coordinate frame in one embodiment according to the present invention. FIG. 6 begins in step 600.

In step 610, high frequency perturbations or "flutter motion" is automatically detected to determine a region of the simulation object to be repaired. In step 620, a reference object is determined different from the simulated object. For example, another simulated object may be determined as the reference object. The reference object may be chosen based on criteria related to the motion, position, type, or attributes of the simulated object.

In step 630, a temporally varying coordinate frame is automatically determined from the reference object. In step 640, the simulation results are time filtered in the region of the simulated object in response to the temporally varying coordinate frame. In step 650, the filtered simulation results are outputted (e.g., the modified simulation results are stored in a database). FIG. 6 ends in step 660.

Figure 7:
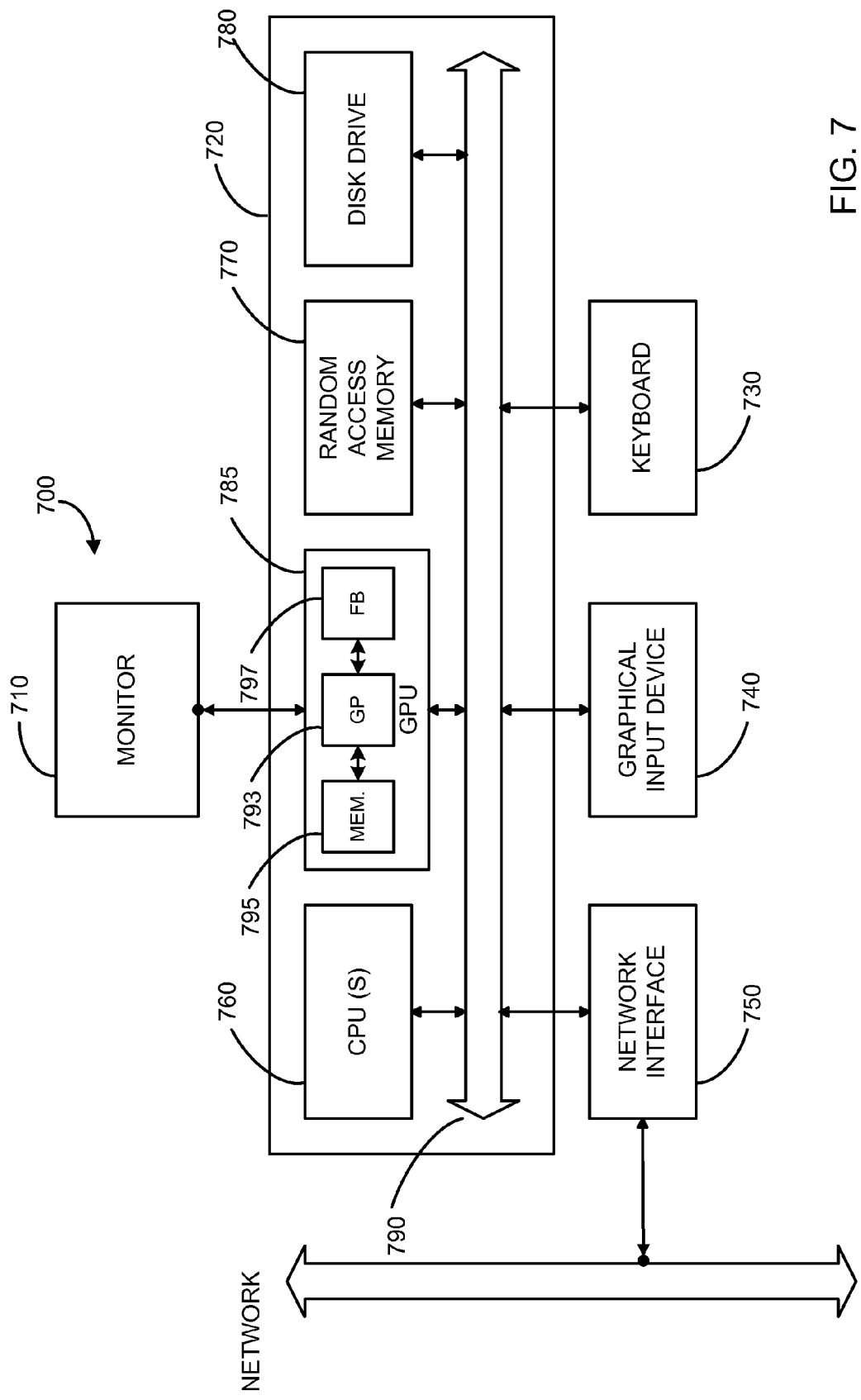
FIG. 7 is a block diagram of a computer system that may be used to practice embodiments of the present invention.

FIG. 7 is a block diagram of a computer system that may be used to practice embodiments of the present invention. FIG. 7 is merely illustrative of an embodiment incorporating the present invention and does not limit the scope of the invention as recited in the claims. One of ordinary skill in the art would recognize other variations, modifications, and alternatives.

In one embodiment, computer system 700 typically includes a monitor 710, computer 720, a keyboard 730, a user input device 740, computer interfaces 750, and the like.

In various embodiments, user input device 740 is typically embodied as a computer mouse, a trackball, a track pad, a joystick, wireless remote, drawing tablet, voice command system, eye tracking system, and the like. User input device 740 typically allows a user to select objects, icons, text and the like that appear on the monitor 710 via a command such as a click of a button or the like.

Embodiments of computer interfaces 750 typically include an Ethernet card, a modem (telephone, satellite, cable, ISDN), (asynchronous) digital subscriber line (DSL) unit, FireWire interface, USB interface, and the like. For example, computer interfaces 750 may be coupled to a computer network, to a FireWire bus, or the like. In other embodiments, computer interfaces 750 may be physically integrated on the motherboard of computer 720, and may be a software program, such as soft DSL, or the like.

In various embodiments, computer 720 typically includes familiar computer components such as a processor 760, and memory storage devices, such as a random access memory (RAM) 770, disk drives 780, a GPU 785, and system bus 790 interconnecting the above components.

In some embodiment, computer 720 includes one or more Xeon microprocessors from Intel. Further, one embodiment, computer 720 includes a UNIX-based operating system.

RAM 770 and disk drive 780 are examples of tangible media configured to store data such as image files, models including geometrical descriptions of objects, ordered geometric descriptions of objects, procedural descriptions of models, scene descriptor files, shader code, a rendering engine, embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various embodiments, computer system 700 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiments of the present invention, GPU 785 may be any conventional graphics processing unit that may be user programmable. Such GPUs are available from NVIDIA, ATI, and other vendors. In this example, GPU 785 includes a graphics processor 793, a number of memories and/or registers 795, and a number of frame buffers 797.

FIG. 7 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Further aspects of embodiments of the invention are illustrated in the attached figures. Additional embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention.

Any of the above described steps may be embodied as computer code on a computer readable medium. The computer readable medium may reside on one or more computational apparatuses and may use any suitable data storage technology.

The present invention can be implemented in the form of control logic in software or hardware or a combination of both. The control logic may be stored in an information storage medium as a plurality of instructions adapted to direct an information processing device to perform a set of steps disclosed in embodiment of the present invention. Based on the disclosure and teachings provided herein, a person of ordinary skill in the art will appreciate other ways and/or methods to implement the present invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method for repairing object simulations, the method comprising:
    receiving, at one or more computer systems, information identifying a region of a simulated object to be repaired;
    determining, with one or more processors associated with the one or more computer systems, a temporally varying coordinate frame; and
    altering simulation results in the region of the simulated object to be repaired in response to the temporally varying coordinate frame;
    wherein altering the simulation results in the region of the simulated object to be repaired comprises interpolating between at least two temporally distinct shapes of the simulated object in response to the temporally varying coordinate frame.

2. The method of claim 1 wherein receiving the information identifying the region of the simulated object to be repaired comprises determining the region with the one or more processors associated with the one or more computer systems in response to input from a user selecting the region of the simulated object to be repaired.

3. The method of claim 2 wherein the input of the user comprises selection of a boundary of the region of the simulated object to be repaired.

4. The method of claim 1 wherein receiving the information identifying the region of the simulated object to be repaired comprises determining algorithmically with the one or more processors associated with the one or more computer systems the region of the simulated object to be repaired.

5. The method of claim 4 wherein the region is determined automatically in response to a flutter detection algorithm.

6. The method of claim 1 wherein determining, with one or more processors associated with the one or more computer systems, the temporally varying coordinate frame comprises determining the temporally varying coordinate frame in response to input from the user selecting one or more regions of a reference object.

7. The method of claim 6 wherein the reference object comprises the simulated object.

8. The method of claim 6 wherein the reference object comprises an object different from the simulated object.

9. The method of claim 1 wherein determining, with one or more processors associated with the one or more computer systems, the temporally varying coordinate frame comprises determining algorithmically the temporally varying coordinate frame.

10. The method of claim 1 wherein the simulated object comprises one or more of a cloth object, a hair object, or a volumetric object.

11. A non-transitory computer readable media storing a set of code modules which when executed by a processor of a computer system become operational with the processor for repairing object simulation, the non-transitory computer readable medium comprising:
- code for determining a region of a simulated object to be repaired;
- code for determining a temporally varying coordinate frame; and
- code for altering simulation results in the region of the simulated object to be repaired in response to the temporally varying coordinate frame;
- wherein the code for altering the simulation results in the region of the simulated object to be repaired comprises code for interpolating between at least two temporally distinct shapes of the simulated object in response to the temporally varying coordinate frame.

12. The non-transitory computer readable medium of claim 11 wherein the code for determining the region of the simulated object to be repaired comprises code for determining the region in response to input from a user selecting the region of the simulated object to be repaired.

13. The non-transitory computer readable medium of claim 12 wherein the input of the user comprises selection of a boundary of the region of the simulated object to be repaired.

14. The non-transitory computer readable medium of claim 11 wherein the code for determining the region of the simulated object to be repaired comprises code for determining algorithmically the region of the simulated object to be repaired.

15. The non-transitory computer readable medium of claim 14 wherein the region is determined automatically in response to a flutter detection algorithm.

16. The non-transitory computer readable medium of claim 11 wherein the code for determining the temporally varying coordinate frame comprises code for determining the temporally varying coordinate frame in response to input from the user selecting one or more regions of a reference object.

17. The non-transitory computer readable medium of claim 16 wherein the reference object comprises the simulated object.

18. The non-transitory computer readable medium of claim 16 wherein the reference object comprises an object different from the simulated object.

19. The non-transitory computer readable medium of claim 11 wherein the code for determining the temporally varying coordinate frame comprises code for determining algorithmically the temporally varying coordinate frame.

20. The non-transitory computer readable medium of claim 11 wherein the simulated object comprises one or more of a cloth object, a hair object, or a volumetric object.

21. A method for repairing object simulations, the method comprising:
- receiving, at one or more computer systems, information identifying a region of a simulated object to be repaired;
- determining, with one or more processors associated with the one or more computer systems, a temporally varying coordinate frame; and
- altering simulation results in the region of the simulated object to be repaired in response to the temporally varying coordinate frame;
- wherein altering the simulation results in the region of the simulated object to be repaired comprises time filtering the region to be repaired with the one or more processors associated with the one or more computer systems in response to the temporally varying coordinate frame.

22. A non-transitory computer-readable medium storing a set of code modules which when executed by a processor of a computer system become operational with the processor for repairing object simulation, the non-transitory computer readable medium comprising:
- code for information identifying a region of a simulated object to be repaired;
- code for determining a temporally varying coordinate frame; and
- code for altering simulation results in the region of the simulated object to be repaired in response to the temporally varying coordinate frame;
- wherein the code for altering the simulation results in the region of the simulated object to be repaired comprises code for time filtering the region to be repaired with the one or more processors associated with the one or more computer systems in response to the temporally varying coordinate frame.

* * * * *

UNITED STATES PATENT AND TRADEMARK OFFICE
CERTIFICATE OF CORRECTION

PATENT NO. : 8,054,313 B1
APPLICATION NO. : 12/045208
DATED : November 8, 2011
INVENTOR(S) : Baraff et al.

Page 1 of 1

It is certified that error appears in the above-identified patent and that said Letters Patent is hereby corrected as shown below:

Title page, Item (73) Assignee: delete "Redwood Shores" and insert -- Emeryville --

Signed and Sealed this
Twenty-first Day of August, 2012

David J. Kappos
*Director of the United States Patent and Trademark Office*